April 26, 1938.  A. D. EDGINGTON  2,115,385
HARVESTER REEL
Filed Jan. 16, 1937  3 Sheets-Sheet 1
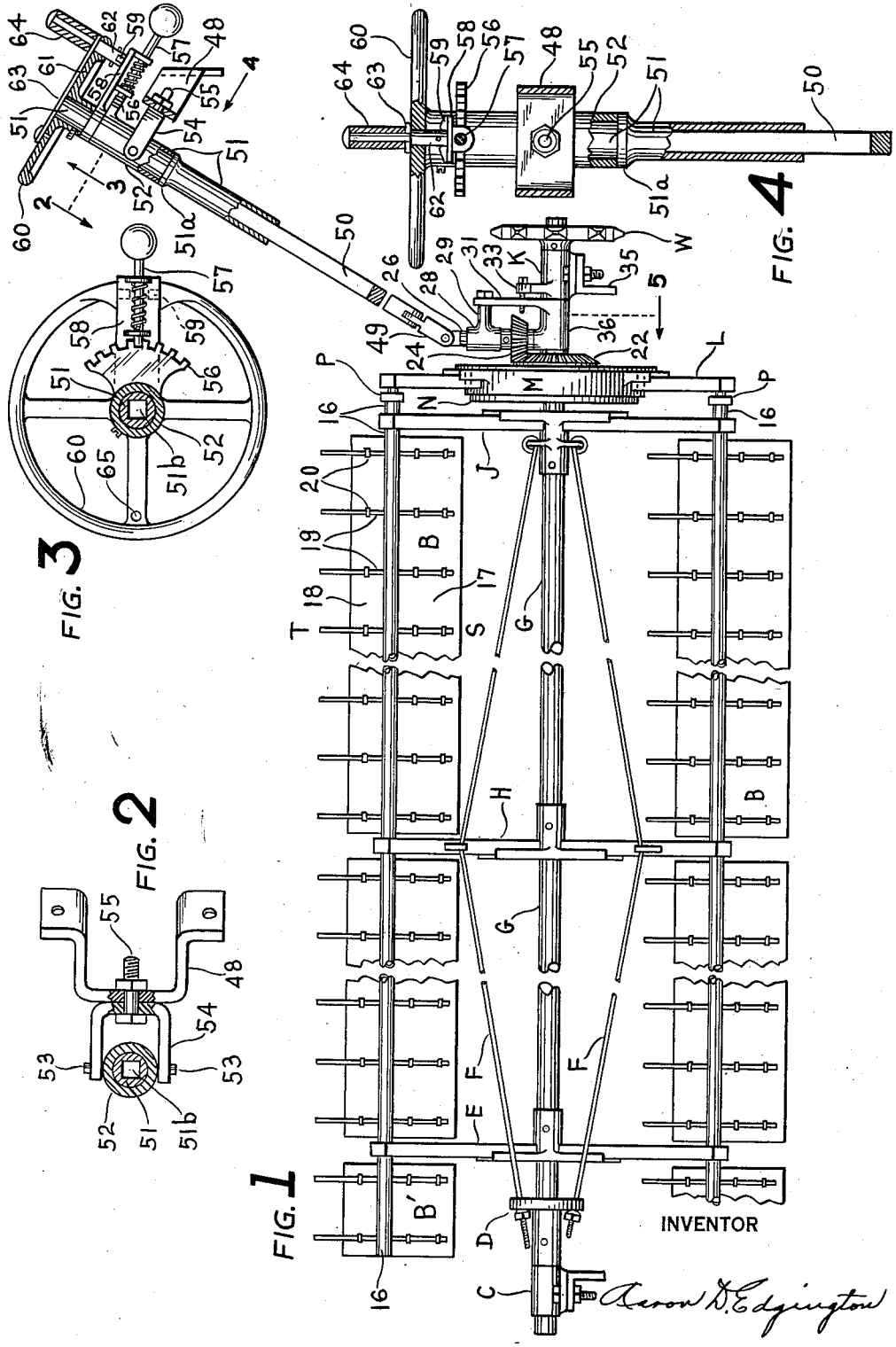
INVENTOR
Aaron D. Edgington

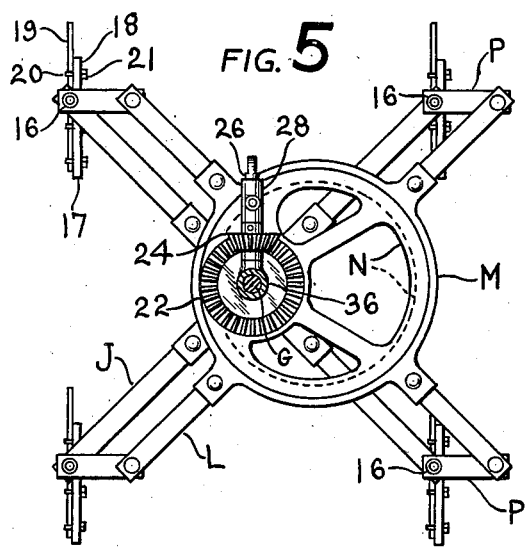
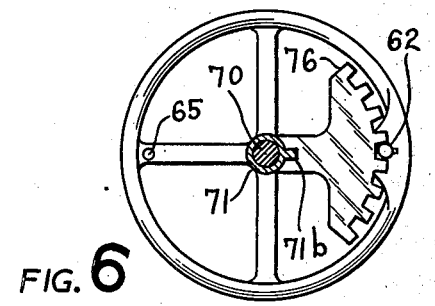
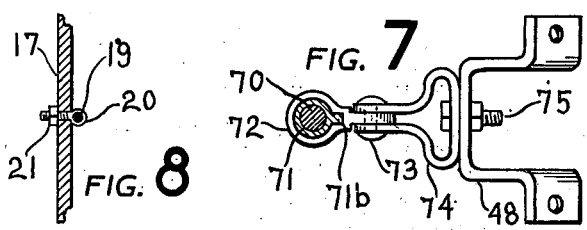
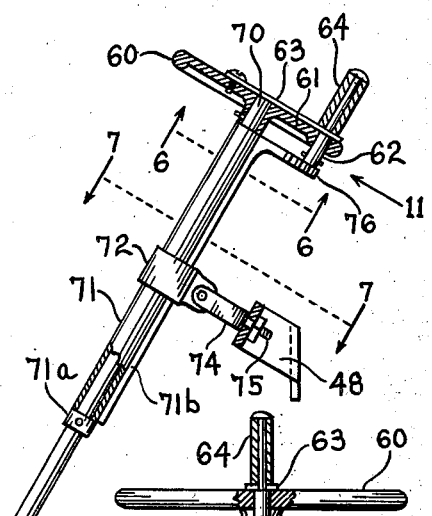
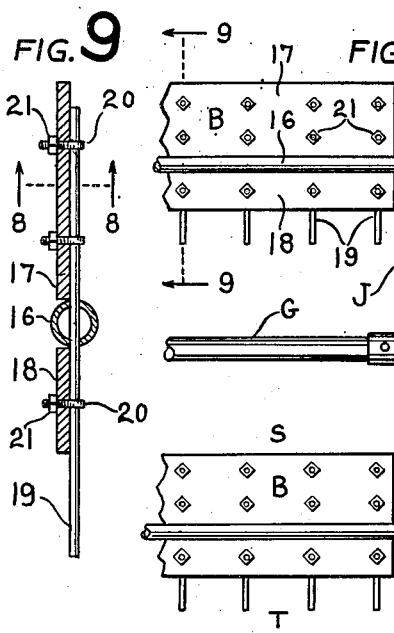
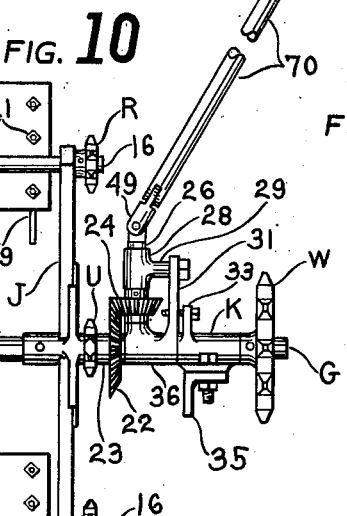
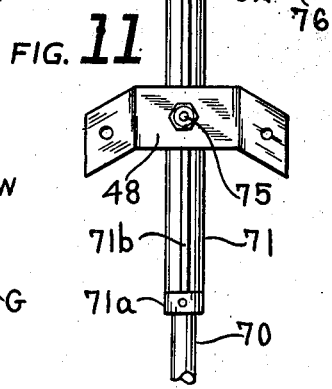
INVENTOR
Aaron D. Edgington April 26, 1938.  A. D. EDGINGTON  2,115,385
HARVESTER REEL
Filed Jan. 16, 1937   3 Sheets-Sheet 3
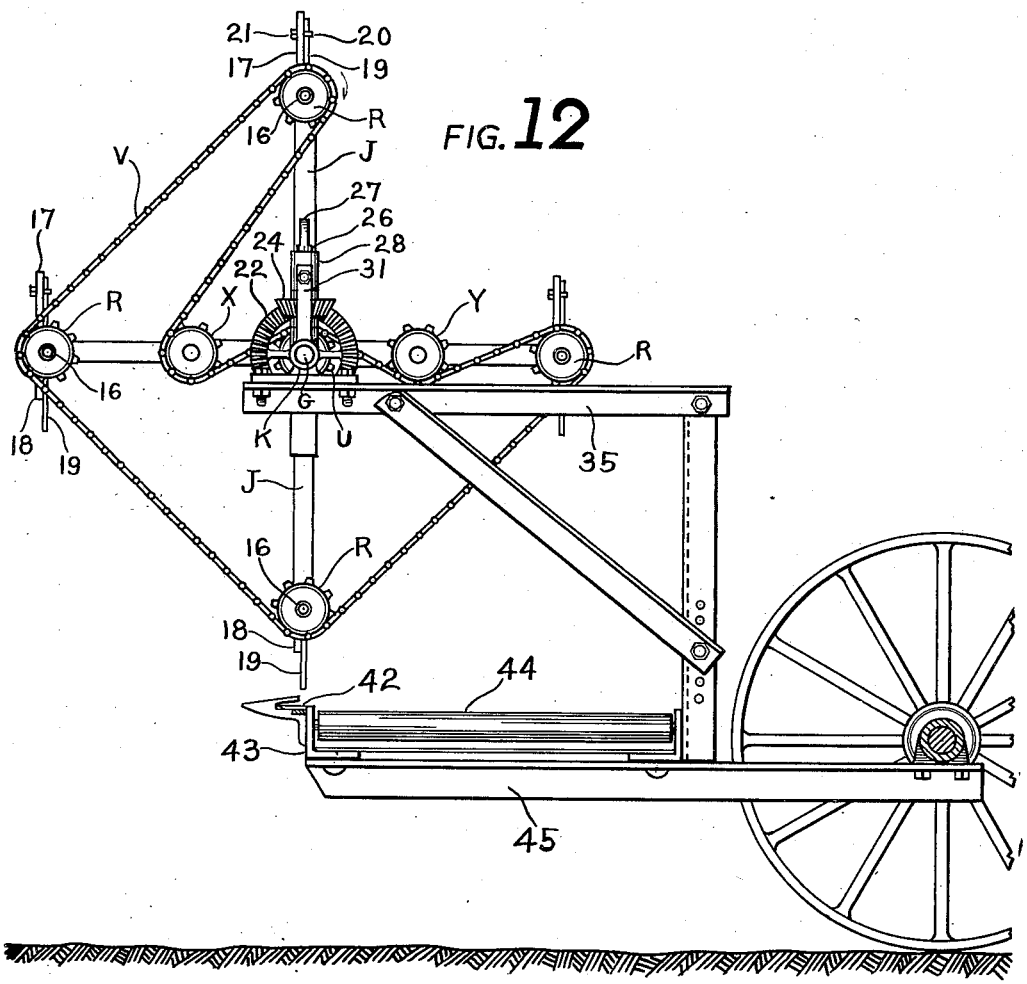
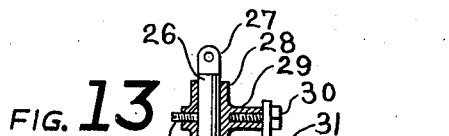
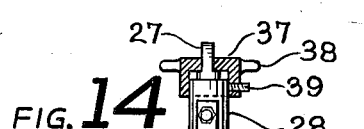
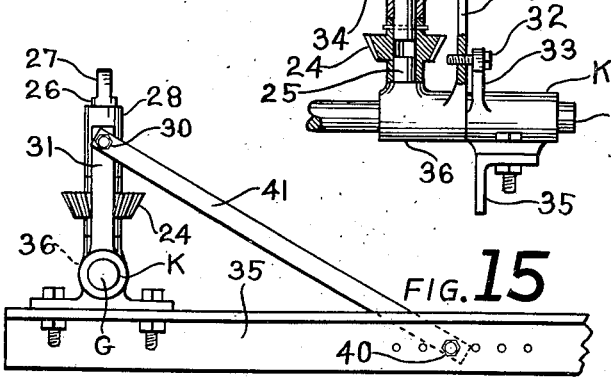
INVENTOR
Aaron D. Edgington Patented Apr. 26, 1938

2,115,385

UNITED STATES PATENT OFFICE 2,115,385

HARVESTER REEL

Aaron D. Edgington, Cheney, Wash., assignor to Cheney Weeder Company, Cheney, Wash., a corporation of Washington Application January 16, 1937, Serial No. 120,917

22 Claims. (Cl. 56—226)

The present invention relates to certain new and useful improvements in that class of harvester reels wherein the bats and reel move in a planetary system. The invention is particularly directed to an improved pivoted bat having two different working wings oppositely disposed parallel to the pivot axis of the bat, and means are provided for inverting the bat to alternately bring each working wing to the same operative position.

The reel carries a series of these improved pivoted bats disposed parallel to each other, and means are provided to maintain all of the bats in a general upright position during the revolution of the reel, improved means are provided for inverting all of the bats simultaneously, and instrumentalities are provided to alter the range of the inverting movement, so that the inclination of all of the bats can be simultaneously altered at will, while maintaining them parallel, and the invention is adapted to invert the bats at any inclination at which they may be set or reset.

It has become general practice to employ pivoted bats in harvester reels and to provide means to hold them in a general downward position irrespective of the revolution of the reel, so as to present the bats to the grain, free from the changing inclination otherwise due to the revolution of the reel.

Various instrumentalities are in general use for such purposes. Prior art patents disclose various forms of eccentrics operatively connected with pivoted bats, usually by means of a crank. Various forms of sprocket chain drives are also employed. In the sprocket form of drive, a sprocket wheel is loosely mounted on the reel axle and held against turning therewith, a sprocket chain is trained about this wheel and carried over like wheels fixed to the pivoted bats, in such manner as to turn all of the bats in the same direction and opposite to the turning of the reel. In some instances, the pivoted bats are provided with cranks, and links are employed as operative connections from one crank to another; in which case, one or more of the bats are turned by sprockets and chain drive as before mentioned and the cranks and links impart a like movement to the other bats.

In some constructions gears are used for the purpose of spacing, instead of sprocket chains; and of course such gear system may be employed in conjunction with the aforementioned cranks and links; or, all of the bats may be turned by the gear system in the absence of cranks and links; in either instance the central gear is loosely mounted on the axis of the reel and held against turning so that the revolution of the reel imparts movement to the bats.

In the eccentric type of drive, a spider or head is journaled eccentrically of the reel axis and operatively connected to the pivoted bats, usually by cranks. Each crank may be supplanted by a stationary gear on the spider arm meshing with a gear of the same size fixed to the pivoted bat. Usually the spider turns on a drum which eccentrically surrounds the reel axle so that the path of the spider arms does not cross the axis of the reel, and in this form it is conveniently practical to provide a bearing eccentric of the drum and journaled on the reel axle, so that the eccentrically mounted drum can be turned about the axis of the reel. In some eccentric forms, the drum is supplanted by a crank shaft; and in this form, the path of the spider arms cross the axis of the reel, and therefore the reel axle is journaled in a crank arm rigid with the inner end of the shaft upon which the spider turns; and a like crank arm is rigid with the outer end of this crank shaft and the opposite end of this crank arm is rigid with another shaft which is journaled coaxial with the reel shaft, so as to provide for moving the spider bodily about the axis of the reel. In any instance the spider turns on its own central axis which is eccentric of the axis of the reel. That is to say, the spider rotates on its own axis and can be moved about the axis of the reel eccentrically thereof, and of course the spider must be held in the required position to maintain the inclination of the bats.

The aforementioned eccentric types, the sprocket drives and the gear drives are common knowledge from the disclosures of numerous prior art patents wherein they are described in detail; and they are here included in this purview to evidence that the present invention is equally applicable to any of these various forms of prior art devices, many of which include a lever adapted to set the inclination of the bats.

Broadly, my invention resides in providing an improved bat with the aforementioned two different working wings, and in applying to any one of these prior art constructions an improved operating mechanism which will simultaneously invert all of the bats; and this same operating mechanism sets and resets all of the bats parallel to each other at any desired inclination and holds such inclination throughout the revolution of the reel.

My improved operating mechanism can readily be applied to either the eccentric type, the sprocket drive, or the gear drive, and in each instance includes a gear journaled on the axis of the reel shaft, and this gear is rigid with either the eccentric hub, or with the loosely mounted sprocket, or with the loosely mounted gear, as the case may be, such optional members by necessity turning on the axis of the reel in each instance, whether directly on the reel axle or otherwise. Suitable manually operated means are provided for actuating the operating mechanism to change the inclination of the bats, to hold the bats at fixed inclination throughout the revolution of the reel and to expeditiously invert the bats to alternately present either of the two different working wings to the same operative position at any required inclination.

The accompanying drawings illustrate the principle of my invention as applied to one form of eccentric type reel and to one form of sprocket drive reel and it is to be understood that the invention embraces all known forms of reels to which the claimed improvements are applicable, and that the illustrations are merely suggestive embodiments and are not intended in a limiting sense.

Figure 1 shows a condensed front elevation of an eccentric type reel with my invention applied thereto, parts being shown in section.

Figure 2 is an enlarged detail of a section taken on the line 2 of Figure 1.

Figure 3 is an enlarged detail of a section taken on the line 3 of Figure 1.

Figure 4 shows a side view looking in the direction of the arrow 4 of Figure 1, with parts broken away.

Figure 5 shows a section taken on the line 5 of Figure 1.

Figure 6 is an enlarged detail of a section taken on the line 6 of Figure 10.

Figure 7 is an enlarged detail of a section taken on the line 7 of Figure 10.

Figure 8 is an enlarged detail of a section taken on the line 8 of Figure 9.

Figure 9 is an enlarged detail of a section taken on the line 9 of Figure 10.

Figure 10 is a fragmentary front elevation of a sprocket type reel with a modified form of my invention applied thereto, parts being shown in section, and with the sprocket chain and idler wheels removed.

Figure 11 shows a side view looking in the direction of the arrow 11 of Figure 10.

Figure 12 is an end view of a sprocket type reel on a wheel supported frame.

Figure 13 is an enlarged sectional detail showing the manner of mounting the bat actuating pinion.

Figure 14 is an end view of Figure 13, with a wrench cap shown in section.

Figure 15 shows a modification of Figure 14, with the wrench cap omitted.

Wheat and similar small grain are usually harvested with a combine when they are grown on large acreage. In the Western States where such grains abound, it is the usual custom to head the wheat; that is to say, the grain heads are cut with short straw and the major portion of the straw is left as stubble. When this procedure is followed, the combine can pass through the field with greater speed due to minimizing the amount of straw which passes through the threshing mechanism. Previous weather conditions often lay some of the grain close to the ground and it is quite impossible to cut these areas without including considerable length of straw. A large acreage will present alternate areas of standing grain and down grain; the standing grain can be headed and the down grain must be cut with full length straw. This unavoidable condition presents two extremes which a reel with one type of bat can not efficiently handle, and there is considerable loss of grain and much inconvenience and impediment to the harvesting operation.

Where only heads and short straw are cut, the reel slats must pass quite close to the sickle to effectively move these distinctly separate heads over to the draper for conveying to the threshing mechanism. When an area of down grain is encountered the sickle must by necessity be lowered close to the ground and will of course cut full length straw, which will not readily pass between the sickle and a slat otherwise close enough thereto to move only heads of grain. Where the reel slats are spaced far enough from the sickle to pass the straw mass of down grain, they are not efficient when the grain is merely headed, and then there is considerable loss due to heads of grain escaping to the ground.

The reversible bats of the present invention are adapted to operate efficiently under these extreme conditions and to alternately move headed grain and straw mass to the draper for conveying to the threshing mechanism; and improved means are provided for alternating the operation of the bats in accordance with the predicaments unavoidably occasioned by varying conditions of the grain. The operation of the bats can be controlled from the header operator's platform so that the inclination and the inverting of the bats are under immediate control without interrupting the harvesting operation.

The reel proper comprises a series of bats B rigid with reel shafts 16 journaled in heads such as E and J which are rigid with the axle G which turns in the fixed end bearings C and K carried by the harvester or combine, as is illustrated in Figures 1 and 10.

As best seen in Figures 8 and 9, the bats B are secured to the bat shafts 16 in an improved manner. Each bat collectively referred to as B, comprises a wide slat 17 and a narrow slat 18 secured on opposite sides of the bat shaft 16 by means of rods 19 which pass through the bat shaft, and each rod 19 is clamped to both of the slats 17 and 18 by means of eyebolts 20 which fit around the rod 19 and pass through the slat, suitable nuts 21 being employed to cinch up the eyebolts until the rod 19 is securely clamped to both of the slats 17 and 18. It will be seen that this improved construction securely locks both of the slats 17 and 18 in fixed relation with the bat shaft 16 and with the rods 19 which also serve as reel tines by extending beyond the edge of the narrow slat 18. The rods 19 pass freely through the reel shaft 16, and it will be readily seen that by loosening the nuts 21, any individual rod 19 can with facility be removed and replaced, when required for any reason. This improved construction materially lessens the cost of production, the small eyebolts being inexpensive and no preparation of the rods 19 being required other than cutting into suitable lengths. The usual variations experienced in the length of the rods 19 can readily be accommodated by slidably adjusting each rod in the eyebolts so that all of the rods project the same distance from the edge of the narrow slat 18, thereby forming an accurate assembly without the necessity and expense of extreme precaution in cutting the rods.

When assembled in the described manner, each bat presents two working wings T and S, the latter having a slat edge and the former having projecting tines.

This improved construction forms a light weight sturdy reel, but due to the fact that such reels are usually of considerable length, suitable truss rods are provided as indicated at F, with suitable take-up as indicated at D. To provide ample room for the take-up at D, the head E is spaced inwardly from this end of the reel axle, and the bat shafts 16 with the hereinbefore described slats and tines, extend outwardly beyond the head E to sweep around the space between the head E and the end bearing C, as is indicated at B' in Figure 1. It will be seen that the improved bat construction is particularly adaptable to this short extention B' which covers an area which would otherwise be left without bat service.

The series of bats may be held in parallel relation to each other and rotated opposite to the revolution of the reel by any well known instrumentalities; as for instance, in Figures 1 and 5, I show an idler head L provided with an enlarged bearing rim M which turns on the drum N which is eccentrically journaled on the reel axle G. Each reel shaft 16 has a crank arm P rigidly secured thereto, and the opposite end of each crank arm P is pivotedly connected to the idler head L in such manner that when the reel axle G is turned by means of power applied to the wheel W, that the series of bats are held parallel to each other and at whatever inclination they are set, provided that the eccentrically journaled drum N is held against turning, in which case the idler head L will be turned upon the drum N and the crank arms P will cause each bat to rotate in the direction opposite to the revolution of the reel; all of which is generally understood and common practice.

The operation just described can be accomplished by various other well known instrumentalities; as for instance, in Figures 10 and 12, the previously mentioned crank arms P are supplanted by sprockets R rigid with the bat shafts 16, and a sprocket U of the same size is journaled on the reel axle G. A sprocket chain V is trained around the several sprockets R and over the central sprocket U, idler sprockets X and Y being employed to afford proper embrace of the sprocket chain upon the central sprockets U, it being essential that the sprocket chain train over the sprocket U in the same direction as over each of the sprockets R.

It will be readily understood that when the sprocket U is held against turning, while the reel axle is turned, that the bats will be rotated in a direction opposite to the revolution of the reel and that the bats will be maintained in parallel relation to each other and at any inclination at which they may be set, all of which is generally understood and common practice.

To the foregoing and other kindred constructions, the present invention provides an improved construction for altering the inclination of the bats and for inverting and reinverting them to alternately present each of the aforesaid working wings T and S to the same operating position, as circumstances suggest and necessity requires, according to the conditions of the crop being harvested.

In carrying out my invention, a gear 22 is journalled on the reel axle G, and this gear 22 is rigid with the drum N which is excentrically journaled on the reel axle as before described, the construction being shown in Figures 1 and 5. Where the bats are actuated by sprockets and chain as before described, then the gear 22 is rigid with the sprocket U which is journaled on the reel axle; as for instance, by both being carried by the same hub 23, as will be readily understood from Figure 10 where the sprocket chain and idler sprockets X and Y have been removed to afford clarity of the illustration.

Meshing with the gear 22 is a pinion 24, and it will be plain from Figures 1, 5, 10, and 12 that the reel shafts 16 can be turned by causing the pinion 24 to turn the gear 22.

Figure 13 shows an enlarged sectional detail of the manner of mounting the pinion 24 as shown in front elevation in Figures 1 and 10, and in side elevation in the enlarged detail of Figure 14.

The pinion 24 is journaled on a pivot 25 which rises from a suitable boss on a sleeve 36 which is journaled on the reel axle G. Rigid with the pinion 24 is a stem 26 which turns in a sleeve 28 held in fixed relation by means of a bolt 30 threaded into a boss 29 and passing through an arm 31 rigid with the sleeve 36. As shown in Figures 1 and 10 the sleeve 36 is disposed between the gear 22 and the end bearing K, and since the sleeve 36 is coaxial with the gear 22 it will be readily understood that this construction provides for orientation of the axis of the pinion 24 about the axis of the gear 22. The axis of the pinion 24 may be held at fixed orientation by any suitable means; as for instance, by means of a bolt 32 passed through the sector 33 rigid with the end bearing K, the bolt 32 being threaded into the arm 31 rigid with the sleeve 36 as aforesaid, suitable holes in the sector 33 sufficing to alter the orientation of the axis of the pinion 24.

The axis of the pinion 24 may also be held at selected orientation by means of a bar 41 held by the bolt 30 and by a bolt 40 passed through the frame portion 35 which supports the end bearing K, suitable holes being provided for adjustment; the construction being shown in Figure 15.

It will also be apparent from Figure 13, that the arm 31 can be omitted by the simple expedient of making the sector 33 of sufficient height to register with the bolt 30 and the bore in the boss 29. It will also be apparent that the sleeve 36 may be made integral with the end bearing K and with the axis of the pinion disposed at any fixed inclination; and of course, such members as 32, 33, 40, and 41 are then unnecessry.

It will also be understood that the stem 26 may extend entirely through the pinion 24, and be journaled in a bore supplanting the pivot 25.

To maintain the bats at any set inclination, the stem 26 may be held against turning by a suitable set screw 34 threaded through the sleeve 29 and seating upon the stem 26.

To avoid mutilation of the stem, I may employ a wrench cap 37 having an aperture complementary to the flattened end 27 of the stem 26, the wrench cap fitting over the sleeve 28 and being held by a set screw 39 seating upon the sleeve in order to avoid mutilation of the stem 26. If desired, the wrench cap 37 may be provided with wings 38 to afford suitable grasp for turning the stem 26 to turn the bats B.

As thus far described the bats can be angled, and/or inverted by means of any suitable wrench applied to the flattened end 27 of the stem 26 or by means of a rod or other suitable tool inserted into the hole in the flattened end 27, after which the bats can be held at the set inclination by means of either of the aforesaid set screws 34 or 39.

To afford greater facility, I discard such set screws and provide improved construction for altering the inclination of bats and for inverting them from a remote position, such as from the operator's platform of the conventional combine.

In practice the reel is carried on a wheel supported frame such as indicated in Figure 12, where the tines 19 are shown directed towards the sickle 42 carried by the platform, collectively referred to as 43, upon which is journaled a roller 44 for the reception of a suitable draper not here shown. The platform is usually weighed or counterbalanced and provided with means for raising and lowering the front edge by turning the beams 45 on the wheel axle, all of which is general practice and common knowledge, and therefore is not here shown.

To accommodate the raising and lowering of the wheeled frame carrying the reel, I provide a drive shaft connected to the stem 26 by a universal joint, and this drive shaft extends to the operator's position where it is mounted so as to afford sliding, rocking and swinging movements in response to the rise and fall of the reel.

Figures 1, 2, 3, and 4 show the preferred embodiment, wherein a flat shaft 50 which may be either a round shaft having one flat side, or else rectangular as here shown, is connected to the stem 26 by means of a universal joint as shown at 49. The shaft 50 is slidably engaged within a sleeve 51 which has a passage 51b complementary to the shaft 50. This sleeve is of sufficient length to accommodate the range of slidable movement of the shaft 50 which is occasioned by the rise and fall of the reel in operation. The sleeve 51 turns in a bearing 52 rockingly mounted at 53 in a hanger 54 which is provided with a pivot connection 55 by means of which the hanger is swiveled to any suitable support such as the bracket 48 or else to some convenient part of the combine upon which the device is employed. From this description it will be seen that sliding, rocking and swinging movements are provided for the shaft 50.

The shaft 50 being held against turning in the sleeve 51, it is conveniently turned by means of a crank handle 61 rigidly secured to the sleeve 51. The crank handle 61 is here shown in the form of a wheel 60, which carries a latch 62 urged by a spring 63 and the latch 62 is provided with a swiveled handle grip 64 by means of which both the latch 62 and the wheel 60 are operated. A latch plate 58 is journaled on the sleeve 51 between the hub of the wheel 60 and the bearing 52 rigid with which is a notched sector 56 which cooperates with the latch plate 58. To preclude slidable movement of these parts, the sleeve 51 is provided with a flange or collar 51a fitting against the lower end of the sleeve 52.

The latch plate 58 is provided with suitable means for engaging the latch 62; as for instance lugs 59. Slidably mounted below the latch plate 58 is a spring urged detent 57 which engages with the notched sector 56. From this description it will be plain that the latch plate 58 can be moved over the sector and locked in selected position by means of the spring urged detent 57, and in this manner, the wheel 60 can be held in various positions of rotation by means of the latch 62. It will also be plain that when the latch 62 is engaged with the latch plate 58 that movement of the latter over the sector 56 will alter the inclination of the bats B by means of the other instrumentalities hereinbefore described.

In order that one complete turn of the wheel 60 will exactly invert the bats B, the gear 22 is made with twice the number of teeth as the pinion 24, in which case it will be plain that the latch 62 can conveniently be lifted by means of the grip 64 and the wheel 60 rotated to bring the latch again into engagement between the lugs 59 which will turn the bats 180 degrees and exactly invert them from tines up to tines down and vice versa, repeatedly and in the same direction, which should be in the direction of the revolution of the reel, for the reason that the turning of the reel will provide most of the power required to invert the bats and but little effort will be required to turn the wheel 60 by hand, while if the direction of inverting is opposite to the revolution of the reel, several times the effort will be required to turn the wheel 60. Furthermore, this advised mode of operation repeatedly inverts the bats by turning the operative edge towards the platform 43, which of course carries the grain towards the platform in contradistinction to the reverse procedure which would cause the bats to move the grain then immediately before them, back into the field which would result in loss.

Figures 6, 7, 10, and 11 show a modified construction of the bat actuating shaft and its correlated parts. As here shown the round shaft 70 turns in a sleeve 71 slidably engaged within a bearing 72. The sleeve 71 carries a spline 71b which slides in a complementary channel in the bearing 72 to preclude turning of the sleeve in its bearings. The bearing 72 is rockingly mounted at 73 in a hanger 74 carrying a pivot 75 by means of which it is swiveled to a suitable support such as the bracket 48 or else to some convenient part of the combine upon which the device is employed.

The shaft 70 is turned by the wheel 60 rigid therewith and carrying the hereinbefore described latch 62 urged by the spring 63. Rigid with the sleeve 71 is a notched sector 76 with which the latch 62 engages directly. From this description it will be readily understood that the inclination of the bats B can be altered by moving the latch 62 about the notched sector and engaging the latch in a selected notch. The bats B can be inverted by one complete turn of the wheel 60 and returning the latch 62 to the same notch.

The shaft 70 is held against sliding movement in the sleeve 71 by means of a collar 71a which secures the sleeve in fixed relation between the hub of the wheel 60 and the collar 71a, and it will be readily seen that in the sliding movement, the shaft 70, the sleeve 71, the sector 76 and the wheel 60 all move as a unit to assure that the latch 62 will not leave the sector 76. It will also be seen that sliding, rocking and swinging movements are provided for the shaft 70.

It will be seen that the construction just described can also be utilized for altering the angle of single edge bats and for inverting the same to non-operative position in emergencies such as when an obstruction accidentally lodges in the path of the bats. To hold my improved double winged bats with both wings in non-operative position, the wheel 60 is provided with a hole 65 through which any convenient pin may be passed to temporarily serve the purpose of the latch 62 when the wheel 60 is rotated only 180 degrees in such emergencies. It will also be seen that the construction shown in Figure 1 can be utilized for altering the inclination of single edge bats; and if desired for this purpose, the wheel 60 and its parts may be omitted, and the member 58 made rigid with the sleeve 51 and thus adapt the member 58 to turn the shaft 50.

In the utilization and employment of my invention, the reel with the improved bats is mounted on the frame of the platform of the conventional combine with the edge of the wide slat 17 sufficiently near to the sickle 42 to assure that when heads only of the grain are cut, that the slat 17 will carry them back onto the platform for movement to the threshing mechanism. The wheel 60 is located at the operator's position, usually near the front of the threshing mechanism; and the wheel is of course operatively connected to the stem 26 which is set at the inclination most suitable for the particular location of the wheel 60. As the equipment passes through the field, the inclination of the bats is altered to afford the greatest efficiency according to the conditions encountered, such as differences in the inclination of the ground, and the raising and lowering of the platform to accommodate variations in the height of the grain. It is well known that it is the natural characteristic of grain to stand vertical irrespective of the inclination of the surface of the ground in which it grows. In other words, all standing grain is vertical, while as the equipment passes through the field the inclination of the platform changes with the inclination of the ground surface in the path of travel, and of course, the inclination of the bats changes accordingly, thereby necessitating repeated adjustments to present the bats so that they will properly enter the standing grain. Raising and lowering the platform so as to cut heads only of different height grain will of course change the inclination of the bats and necessitate further adjustment.

To illustrate; as the equipment descends inclined ground and with the platform lowered to head short grain, the bats should be approximately perpendicular to the platform in which condition they will properly part the standing grain. When the equipment then ascends inclined ground, the same inclination of the bats will slap the heads of the grain and shatter out some of the kernels which will be lost in the field; and if the platform is raised to head taller grain, the existing inclination of the bats will be all the more objectionable. In such instances it is necessary to alter the inclination of the bats so as to cause the bats to enter the grain edgewise, as distinguished from the surface of the bat striking downward on the heads of the grain and shattering out the kernels causing them to be lost in the field.

It will be readily appreciated that the present invention provides improved constructions which affords facilities for quickly and easily altering the inclination of the bats according to changing conditions as the equipment travels through the field, thereby conserving much time and expense which would otherwise be required in constructions which preclude altering the inclination of the bats while the equipment is traveling through the field.

When the equipment encounters an area of grain which previous weather conditions has laid near to the ground, the platform is necessarily lowered to get the sickle under this down grain, and unavoidably, considerable straw will be cut and pass over with the grain. This straw mass can not pass freely between the sickle and a slat close enough to handle only heads of grain. To accommodate this condition, the latch 62 is raised and the wheel 60 given one turn, which will invert the bats and bring the tines 19 into operative position, and should necessity require, the inclination of the bats can be altered to afford maximum efficiency. With the tines in operative position as shown in Figure 12 there is adequate room for the straw to pass between the sickle and the narrow slat 18, and in this position the tines 19 efficiently comb the straw mass back onto the platform. It should also be pointed out, that in this operative position, any stray stalks of grain that may be standing among the down grain, will be effectively gathered by the full width of the bats, and the wide slat 17 will preclude the higher heads of such grain from passing back over the bats and into the field as would otherwise occur in the absence of the wide slat 17 under such conditions.

It will be seen that the invention provides improved constructions affording ample facilities for efficient harvesting of grain under the wide range of varying conditions which are unavoidably encountered in harvesting, and that the operation of the bats is under immediate control of the operator without impediment or interruption to the harvesting.

In instances where the crop is in the same general condition and only occasional alteration of the bats is required, the shaft for turning the stem 26 may be omitted, and the latter held by a suitable set screw as hereinbefore described, the inverting of the bats and altering of their inclination being accomplished by means of a suitable wrench applied to the flattened end 27, as for instance the wrench cap 37 shown in Figure 14.

In the present disclosure, I claim as my invention:—

1. In a harvester reel having a series of bats journaled in reel heads rigid with a journaled axle, and said bats rotating in a planetary manner by means of operative connection with a member journaled coaxially with said axle and held stationary; a gear rigid with said member, a pinion meshing with said gear, means to hold said pinion stationary and thereby hold said member stationary, means to turn said pinion and thereby rotate said bats on their journals, whereby said pinion may be employed to repeatedly invert and reinvert said bats in the same direction as the revolution of the reel.

2. In a harvester reel having a series of bats journaled in reel heads rigid with a journaled axle, and having an idler head operatively connected to said bats to cause them to rotate in a planetary manner in coordination with the revolution of said reel, and said idler head turning on a member eccentric of said axle and bodily movable therearound; a gear journaled coaxially with said axle and fixed to said member, a pinion meshing with said gear, means to hold said pinion stationary and thereby maintain the eccentric relation of said member, means to turn said pinion and thereby alter the eccentric relation of said member and consequently rotate said bats, whereby said pinion may be employed to repeatedly invert and reinvert said bats in the same direction as the revolution of the reel.

3. In a harvester reel having a series of bats journaled in reel heads rigid with a journaled axle, and said bats operatively connected in a planetary manner to a sprocket gear journaled coaxially with said axle; a gear rigid with said sprocket gear, a pinion meshing with said gear, means to hold said pinion stationary, means to turn said pinion and thereby rotate said bats, whereby said pinion may be employed to repeatedly invert and reinvert said bats in the same direction as the revolution of the reel.

4. In a harvester reel having a series of bats rotating in a planetary manner during the revolution of the reel and controlled by a rotatable member held stationary; a gear rigid with said rotatable member, a pinion meshing with said gear, whereby said pinion may be employed to rotate said member and thereby rotate said bats and to repeatedly invert and reinvert said bats in the same direction as the revolution of the reel, and means for holding said pinion stationary to effect planetary rotation of said bats during the revolution of said reel.

5. In a harvester reel having a series of bats journaled in reel heads rigid with a journaled axle, and having an idler head operatively connected to said bats to cause them to rotate in a planetary manner in coordination with the revolution of said reel, and said idler head turning on a member eccentric of said axle and bodily movable therearound; a gear journaled coaxially with said axle and fixed to said member, a pinion meshing with said gear, whereby said pinion may be employed to rotate said member and thereby rotate said bats to repeatedly invert and reinvert them in the same direction as the revolution of the reel, and means for holding said pinion stationary to effect planetary rotation of said bats during the revolution of said reel.

6. In a harvester reel having a series of bats journaled in reel heads rigid with a journaled axle, and said bats operatively connected with a gear journaled coaxially with said axle and when held stationary adapted to produce planetary rotation of said bats during the revolution of the reel; a secondary gear rigid with the aforesaid gear, a pinion meshing with said secondary gear, whereby said pinion may be employed to rotate said secondary gear and thereby rotate said bats and to repeatedly invert and reinvert said bats in the same direction as the revolution of the reel, and means to hold said pinion stationary and thereby produce planetary rotation of said bats during the revolution of said reel.

7. In a harvester reel having a series of bats journaled in reel heads rigid with a journaled axle, and said bats actuated in a planetary manner by means of operative connection with a member journaled coaxially with said axle; a gear rigid with said member, a pinion meshing with said gear, a stem rigid with said pinion, a shaft connected to said stem by a universal joint, the opposite end of said shaft carrying means for slidably, rockably, swingingly and rotatably mounting the same upon a fixed support, manually operated means to turn said shaft, and releasable means to hold said shaft at selected rotation.

8. In a harvester reel having a series of bats journaled in reel heads rigid with a journaled axle, and having an idler head operatively connected to said bats to cause them to rotate in a planetary manner in coordination with the revolution of said reel, and said idler head turning on a member eccentric of said axle and bodily movable therearound; a gear journaled coaxially with said axle and fixed to said member, a pinion meshing with said gear, a stem rigid with said pinion, a shaft connected to said stem by a universal joint, the opposite end of said shaft carrying means for slidably, rockably, swingingly and rotatably mounting the same upon a fixed support, manually operated means to turn said shaft, and releasable means to hold said shaft at selected rotation.

9. In a harvester reel having a series of bats journaled in reel heads rigid with a journaled axle, and said bats actuated in a planetary manner by means of operative connection with a member journaled coaxially with said axle; a gear rigid with said member, a pinion meshing with said gear, a stem rigid with said pinion, a flat shaft connected to said stem by a universal joint, said shaft slidably mounted in a sleeve having a bore complementary thereto, said sleeve rotatably mounted in a bearing and held against slidable movement therein, said bearing carrying means for rockably and swingingly mounting the same upon a fixed support, a crank handle rigid with said sleeve, a latch plate rotatably mounted upon said sleeve, a latch cooperating between said latch plate and said crank handle, a notched sector rigid with said bearing, and a detent cooperating between said latch plate and said sector.

10. In a harvester reel having a series of bats journaled in reel heads rigid with a journaled axle, and said bats actuated in a planetary manner by means of operative connection with a member journaled coaxially with said axle; a gear rigid with said member, a pinion meshing with said gear, a stem rigid with said pinion, a shaft connected to said stem by a universal joint, said shaft rotatably mounted in a sleeve, said sleeve slidably mounted in a bearing and held against rotation therein, said bearing having means for rockably and swingingly mounting the same upon a fixed support, a crank handle fixed to said shaft, a latch carried by said crank handle, a notched sector rigid with said sleeve and engaging said latch, and means to hold said shaft against sliding movement in said sleeve.

11. In a harvester reel having a series of bat shafts rotating in a planetary manner during the revolution of the reel and controlled by a rotatable member held stationary; a bat carried by each bat shaft, each bat having two different working wings projecting equally on opposite sides of the bat shaft, a gear rigid with said rotatable member, a pinion meshing with said gear, whereby said pinion may be employed to rotate said member and thereby rotate said bats to repeatedly invert and reinvert them in the same direction as the revolution of the reel, and means for holding said pinion stationary to effect planetary rotation of said bats during the revolution of the reel.

12. In a harvester reel having a rotatably mounted bat shaft; a bat comprising two different working wings, said working wings projecting equally on opposite sides of said bat shaft and fixed to turn therewith, means for rotating said bat shaft to invert and reinvert said bat and thereby alternately position each of said wings to the same leading position while the other wing cooperates as a fender on the opposite side of said bat shaft, and means to maintain said leading position during the revolution of said harvester reel.

13. In a harvester reel having a series of bat shafts rotating in a planetary manner during the revolution of the reel and controlled by a rotatable member held stationary; a bat carried by each bat shaft, each bat having two different working wings respectively disposed on opposite sides of that bat shaft, a gear rigid with said rotatable member, a pinion meshing with said gear, a stem rigid with said pinion, a shaft connected to said stem by a universal joint, the opposite end of said shaft carrying means for slidably, rockingly, swingingly and rotatably mounting the same upon a fixed support, manually operated means to turn said shaft, and releasable means to hold said shaft at selected rotation.

14. In a harvester reel having a series of bat shafts rotating in a planetary manner during the revolution of the reel and controlled by a rotatable member held stationary; a bat carried by each bat shaft, each bat having two different working wings respectively disposed on opposite sides of that bat shaft, a gear rigid with said rotatable member, a pinion meshing with said gear, a stem rigid with said pinion, a shaft connected to said stem by a universal joint, the opposite end of said shaft carrying means for slidably, rockingly, swingingly and rotatably mounting the same upon a fixed support, releasable means to hold said shaft at selected rotation, and manually operated means to turn said shaft, the gear ratio being such that one complete turn of said shaft will exactly invert said bats.

15. In a harvester reel having a series of bat shafts rotating in a planetary manner during the revolution of the reel and controlled by a rotatable member held stationary; a bat carried by each bat shaft, each bat having two different working wings projecting equally on opposite sides of the bat shaft, a gear rigid with said member, a pinion meshing with said gear, flexible drive means operatively connected to said pinion, manually operated means for turning said drive means, releasable means for holding said drive means at selected rotation, and means to latch said drive means at each inverting of said bats, whereby said drive means may be employed to repeatedly invert and reinvert said bats in the same direction as the revolution of the reel.

16. A harvester reel comprising a bat shaft, a slat disposed edgewise on said bat shaft, an eyebolt passed through said slat, a rod passed through said eyebolt and shaft, a second slat disposed edgewise on the opposite side of said bat shaft, an eyebolt passed through said second slat, said rod passing through the last said eyebolt, said eyebolts clamping said rod to said slats, a plurality of said rods and eyebolts at spaced intervals, to thereby hold said rods and slats in fixed relation with said bat shaft.

17. In a harvester reel, a bat shaft, a series of rods passed through said bat shaft, a slat disposed edgewise on said bat shaft and rigidly fixed to said rods, and a second slat disposed edgewise on the opposite side of said bat shaft and rigidly fixed to said rods.

18. In a harvester reel, a bat shaft, a slat disposed edgewise and parallel to said bat shaft and fixed thereto, a series of tines carried by said bat shaft and projecting opposite to said slat an amount equal to the width of said slat, to thereby form two different working wings of like projection.

19. A harvester reel comprising a bat shaft, a slat disposed edgewise on said bat shaft, an eyebolt passed through said slat, a rod passed through said eyebolt and shaft, a narrower slat disposed edgewise on the opposite side of said bat shaft, an eyebolt passed through said narrower slat, said rod passing through the last said eyebolt, said eyebolts clamping said rod to said slats, a plurality of said rods and eyebolts at spaced intervals, to thereby hold said rods and slats in fixed relation with said bat shaft, and said rods projecting outwardly from the edge of said narrower slat to provide a series of tines.

20. In a harvester reel having a series of bat shafts rotating in a planetary manner during the revolution of the reel and controlled by a rotatable member held stationary; a bat carried by each bat shaft, each bat comprising a slat disposed edgewise on said bat shaft, an eyebolt passed through said slat, a rod passed through said eyebolt and shaft, a narrower slat disposed edgewise on the opposite side of said bat shaft, an eyebolt passed through said narrower slat, said rod passing through the last said eyebolt, said eyebolts clamping said rod to said slats, a plurality of said rods and eyebolts at spaced intervals to thereby hold said rods and slats in fixed relation with said bat shaft, and said rods projecting outwardly from the edge of said narrower slat to provide a series of tines, a gear rigid with said rotatable member, flexible drive means operatively connected to said gear, manually operated means for turning said drive means, releasable means for holding said drive means at selected rotation, and means to latch said drive means at each inverting of said bats.

21. In a harvester reel having a series of bats journaled in reel heads rigid with a journaled axle, and said bats actuated in a planetary manner by a member journaled on said axle and held stationary during the rotation of the reel; a beveled gear rigid with said member, a sleeve rotatably mounted upon said reel axle adjacent said gear and held against sliding movement upon said axle, a beveled pinion pivotally mounted upon said sleeve and in mesh with said beveled gear, a stem rigid with said pinion, a sleeve fitted around said stem, an arm rigid with the first said sleeve and bolted to the second said sleeve, means to hold said arm in selected position of orientation, and means to hold said pinion stationary.

22. In a harvester reel having an axle turning in fixed bearings and carrying reel heads rigid therewith and bats journaled in said reel heads and rotating in a planetary manner during the revolution of said reel; an end reel head spaced at some distance from the end bearing, truss members for said axle, a take-up device for said truss members, said take-up device situated between said end reel head and the end bearing adjacent thereto, and a bat extending beyond said end reel head and sweeping about the area between said end reel head and said end bearing.

AARON D. EDGINGTON.